United States Patent
Leisinger et al.

(10) Patent No.: US 6,844,507 B2
(45) Date of Patent: Jan. 18, 2005

(54) DRAFT PROTECTION DEVICE FOR A BALANCE, AND BALANCE EQUIPPED WITH THE DRAFT PROTECTION DEVICE

(75) Inventors: Roger Leisinger, Zürich (CH); Hansjürg Rotach, Effretikon (CH)

(73) Assignee: Mettler-Toledo GmbH, Greifensee (CH)

( * ) Notice: Subject to any disclaimer, the term of this patent is extended or adjusted under 35 U.S.C. 154(b) by 0 days.

(21) Appl. No.: 10/446,564

(22) Filed: May 28, 2003

(65) Prior Publication Data

US 2003/0221874 A1 Dec. 4, 2003

(30) Foreign Application Priority Data

May 29, 2002 (EP) .......................................... 02100577

(51) Int. Cl.⁷ ............................................. G01G 21/28
(52) U.S. Cl. ...................... 177/180; 177/181; 177/238; 312/257.1; 312/265.6
(58) Field of Search ............................... 177/180, 181, 177/238–244; 312/257.1, 265.6

(56) References Cited

U.S. PATENT DOCUMENTS

| | | | | |
|---|---|---|---|---|
| 4,762,190 A | * | 8/1988 | Meixner ..................... | 177/181 |
| 4,798,250 A | * | 1/1989 | Knothe et al. .............. | 177/181 |
| 4,856,605 A | * | 8/1989 | Cornelius et al. ........ | 177/210 R |
| 4,862,978 A | | 9/1989 | Borchard ..................... | 177/180 |
| 5,058,692 A | * | 10/1991 | Melcher et al. ............. | 177/181 |
| 5,152,356 A | * | 10/1992 | Strickler et al. ............ | 177/180 |
| 5,485,684 A | * | 1/1996 | Philipp et al. ................ | 34/226 |

FOREIGN PATENT DOCUMENTS

| | | |
|---|---|---|
| CH | 677029 | 3/1991 |
| CH | 687836 | 2/1997 |
| DE | 3741313 | 7/1988 |
| DE | 8803709 | 12/1988 |
| DE | 198 49 399 A1 | 5/2000 |
| DE | 299 12 867 U1 | 5/2000 |
| DE | 198 48 754 A1 | 5/2001 |
| GB | 182929 | 7/1922 |

\* cited by examiner

*Primary Examiner*—Randy W. Gibson
(74) *Attorney, Agent, or Firm*—Friedrich Kueffner (57) ABSTRACT

A draft protection device (2) has a wind-blocking body (20; 21) that consists of at least two panel elements (20A,20B, 20C; 21A, 21B) and partially encloses the weighing compartment of a balance (1) in which a weighing pan (15) is arranged. The wind-blocking body (20; 21) can be selectively positioned by hand in at least two different orientations. In each of the different orientations at least one opening is available for access to the weighing compartment. The wind-blocking body (20; 21) can be positioned by the user in such a way that the openings resulting from the differently oriented positions allow access to the weighing compartment from different directions.

31 Claims, 7 Drawing Sheets

DRAFT PROTECTION DEVICE FOR A BALANCE, AND BALANCE EQUIPPED WITH THE DRAFT PROTECTION DEVICE

BACKGROUND OF THE INVENTION

The invention relates to a draft protection device for a balance, and it also relates to a balance that is equipped with the draft protection device.

The degree of precision that a balance delivers depends on a variety of factors. Of significance are air drafts which during a measurement are acting on the balance pan inside the weighing compartment. Therefore, to avoid undesirable air drafts, balances are in most cases equipped with devices that protect the weighing compartment from the undesirable effects of air drafts.

A draft protection device performing this function is known, e.g., from reference [1], Swiss Patent CH-677 029 A5. The draft protection device described in this reference consists of four or more wall parts that are hinged together. At least one of the wall parts has a U-profiled frame with a plate or windowpane that is slid into the frame so that it can be removed if necessary, for example to perform a so-called weighing-in procedure, or in general to put objects or materials on the balance in order to weigh them. In addition, a lid is hinged at the upper border of the wall part that forms the rear wall of the weighing compartment, offering an additional opening for access to the weighing compartment.

A further draft protection device, disclosed in reference [2], Swiss Patent CH-687 836 A5, is proposed for balances that have a support base, a fixed rear wall connected to the support base, and a front window panel connected to the rear wall by struts. In addition, there are two sliding doors constituting the side walls of the weighing compartment. In the area of their anterior edges, the sliding doors have guide means that reach around linear guiding elements located below the sliding doors.

Reference [3], published German Patent Application DE 198 49 399 A1, discloses a draft protection device that can be releasably connected to the base of a balance by means of a locking device. This draft protection device also offers a simple way of exchanging the draft shield panels, which makes the draft protection device easy to clean.

The known state of the art further includes draft protection devices with motor-actuated elements as disclosed in references [4] and [5], published German Patent Applications DE 37 41 313 A1 and DE 199 48 754 A1.

The device described in [4] has at least two cylindrically curved wall elements that are movable relative to each other for opening and closing the weighing compartment. The device disclosed in reference [5] has at least two wall elements that can be moved independently of each other by a motorized drive mechanism.

In all of the draft protection devices described in the aforementioned references, there are either fixed ways in which the weighing compartment can be accessed, or the ways of accessing the weighing compartment can be created by the user by removing one or more elements of the draft protection device.

However, it would often be advantageous for the user of a balance to be able to adapt the draft protection device to his requirements with a minimal effort without removing parts of the draft protection device.

It would be of particular advantage, if the user had his own free choice in how to get access to the weighing compartment.

OBJECT OF THE INVENTION

The present invention therefore has the objective to provide a draft protection device with the aforementioned desirable improvements and also to provide a balance that is equipped with the draft protection device.

SUMMARY OF THE INVENTION

The draft protection device according to the invention has a wind-blocking body consisting of at least two panel elements that reach partially around the weighing compartment of a balance in which the weighing pan is arranged. The body can be selectively positioned by hand in at least two different orientations. In each of the differently oriented positions, at least one opening is made available for access to the weighing compartment. The user can position the body with the at least one opening oriented in such a way that the weighing compartment becomes accessible from different directions.

Thus, the user can adapt the draft protection device very easily to the requirements of a present application. The body can be placed either directly on the housing of the balance or on a support base.

In preferred configurations, the body has for example an L-shaped, V-shaped, or U-shaped profile and can be set on the balance in different ways so that the access to the weighing compartment can be from the front, from above, from the left or right side, or simultaneously from two sides. It is of particular advantage that in each of the selectable positions, the inventive draft protection device fully meets the requirements that apply to conventional draft protection devices with regard to stability and functionality.

The body consists preferably of at least two plane or curved panel elements that are either rigidly connected or foldably hinged together and are made of the kinds of materials used for the components of conventional draft protection devices, for example glass, polymer, and/or metal. It is also conceivable that the body is made integrally in one piece.

Also to be considered within the scope of the invention is a draft protection device where one side of the weighing compartment is delimited by a rear wall made of a material that diffuses the transmitted ambient light, particularly a frosted glass (also referred to as frosted glass), so that the weighing compartment can be illuminated advantageously from the rear, or that the weighing compartment can be flooded by the ambient light. On the other hand, balance components located behind the rear wall are kept from view so that they cannot detract from the appearance of the balance. Preferably, a rear wall according to this concept rises substantially vertically from the floor of the weighing compartment. It is likewise conceivable that all or some of the plane or curved panel elements of the body are made of a material that diffuses the transmitted ambient light.

In a preferred embodiment, a rear wall according to the foregoing concept is equipped with a display, in particular a backlit liquid crystal display. This allows the user to have the weighing pan with the weighing object and the display simultaneously in view. It is also possible to provide an illumination device to light up the rear wall from behind.

In particular, the invention includes the concept that the rear wall is removable and configured so that it can be exchanged against another rear wall.

Preferably, there is a means of entirely or partially closing the access openings to the weighing compartment that are created with different placements of the body. This may be accomplished through further wind-blocking elements that swivel or slide, for example door elements or a lid that is hinged on the rear wall. The wind-blocking elements can be permanently installed, or they can be configured so that the user can install them as needed. It is particularly useful if the body in its different positions conforms to the housing of the balance, to the support base and/or to the rear wall and/or to the lid.

The swiveling or sliding wind-blocking elements may in some cases be motor-actuated. Preferably, there is a chamber connected to the rear wall, where the wind-blocking elements can be stowed away when they are not in use. In a preferred embodiment of the invention, the body can be folded and stored likewise inside the chamber.

Preferably, the body is held firmly in place in the selectable positions. This can be realized by simple means such as grooves, ledges, protrusions or brackets on the adjacent housing parts or on the support base. Of course, screws could also be used. The housing can furthermore have adhesive coatings, for example of hard rubber, that hold the body in place by adhesive friction. However, the body can also be held in position by its own weight, so that only position-guiding means may be provided in some cases to set the body in place quickly and precisely.

A further preferred embodiment of the invention has sensors, for example switches or opto-electronic components, to automatically detect the selected position of the body and/or the installed body itself. The controllable elements of the balance, such as motor-driven door elements, the illumination device or the display, can thus be actuated in accordance with the selected position of the body, so as to optimize the level of convenience for the user.

BRIEF DESCRIPTION OF THE DRAWINGS

Details of the invention will be explained below with references to the drawings, wherein.

DETAILED DESCRIPTION OF PREFERRED EMBODIMENTS

Figure 1:
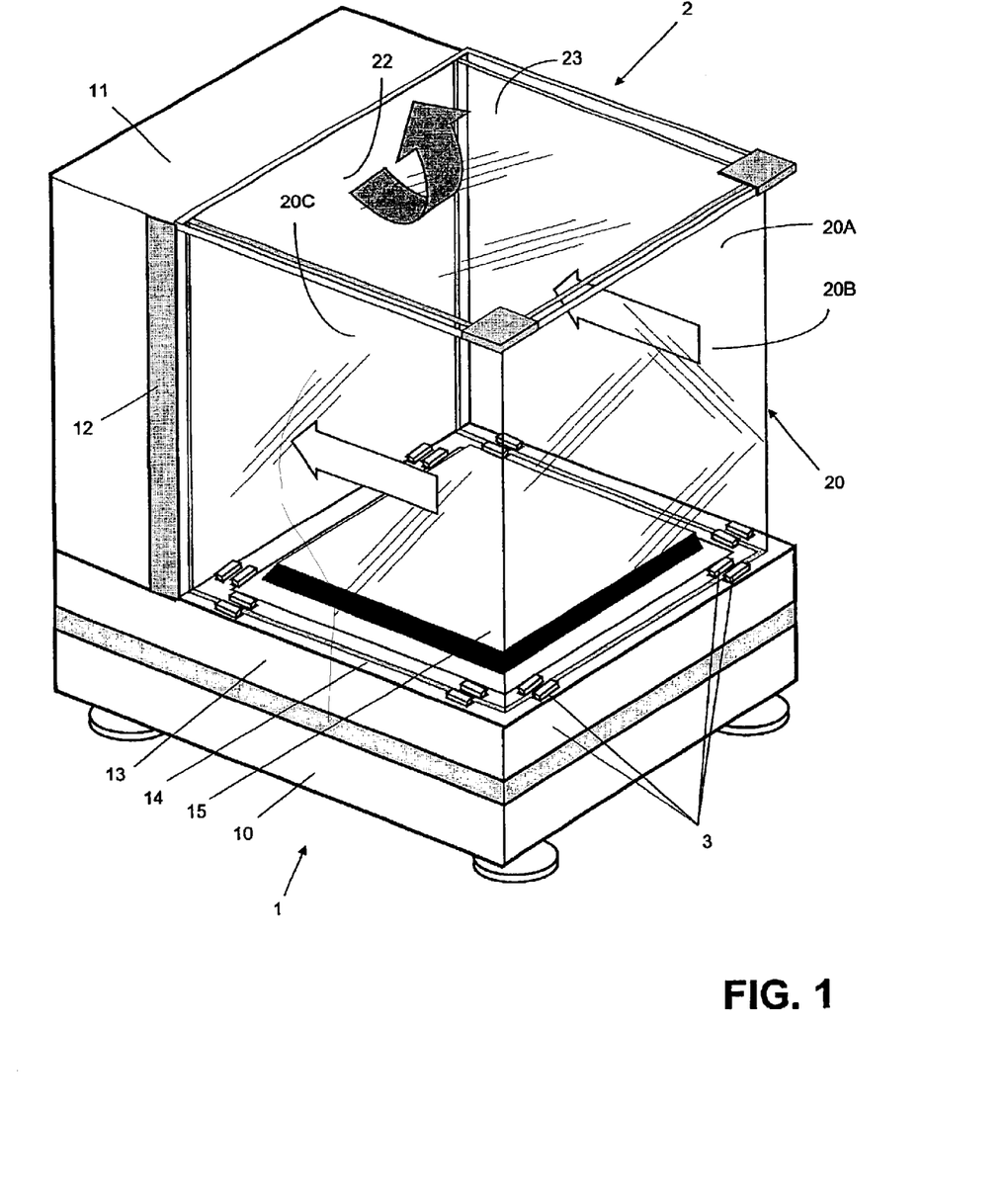
FIG. 1 represents a balance equipped with a draft protection device according to the invention, where a U-shaped body reaches partially around the weighing compartment and where the weighing compartment is accessible from above by lifting a lid.

FIG. 1 shows a balance 1 that is equipped with a draft protection device 2 in accordance with the invention. The weighing compartment is delimited at the bottom by a weighing compartment floor 14 that forms the top of a support base 13, at the top by a lid 23, at the rear by a rear wall 22, and at the front and sides by a U-shaped body 20. The U-shaped body 20, the lid 23, the weighing compartment floor 14 and the rear wall 22 are matched in their dimensions so that the weighing compartment is completely enclosed. With the body 20 positioned as shown in FIG. 1, one would therefore have to raise the lid 23 and access the weighing compartment from the top for weighing-in (i.e., adding material to the weighing pan until a targeted weight is reached) or in general to put objects or materials on the balance.

The U-shaped body 20 resting on the support base 13 has three panel elements 20A, 20B, 20C. The two legs 20A, 20C of the U-profile 1 are pointing towards the rear wall 22 and are connected by the mid-section 20B of the U-profile at the front of the weighing compartment. The legs 20A, 20C and the mid-section 20B are held in place by protrusions 3 that are arranged on the weighing compartment floor 14 on both sides of the panel elements.

As seen in FIG. 1, the balance 1 further has a balance housing 10 containing the weighing cell and weighing electronics that are not shown here. The support base 13, which has a passage opening for the load transmitting member (not shown) connecting the weighing pan 15 to the weighing cell, is arranged here on top of the balance housing 10. The support base can be connected to the balance housing 10 by means of fasteners, or it can also be integrated in the balance housing 10. However, the support base 13, which serves primarily as a seat for the wind-blocking body 20, can also be arranged below the balance housing, for example in a configuration where the support base would serve on the one hand as a standing platform for the balance 1 and on the other hand also as a seat for the wind-blocking body 20.

Figure 2:
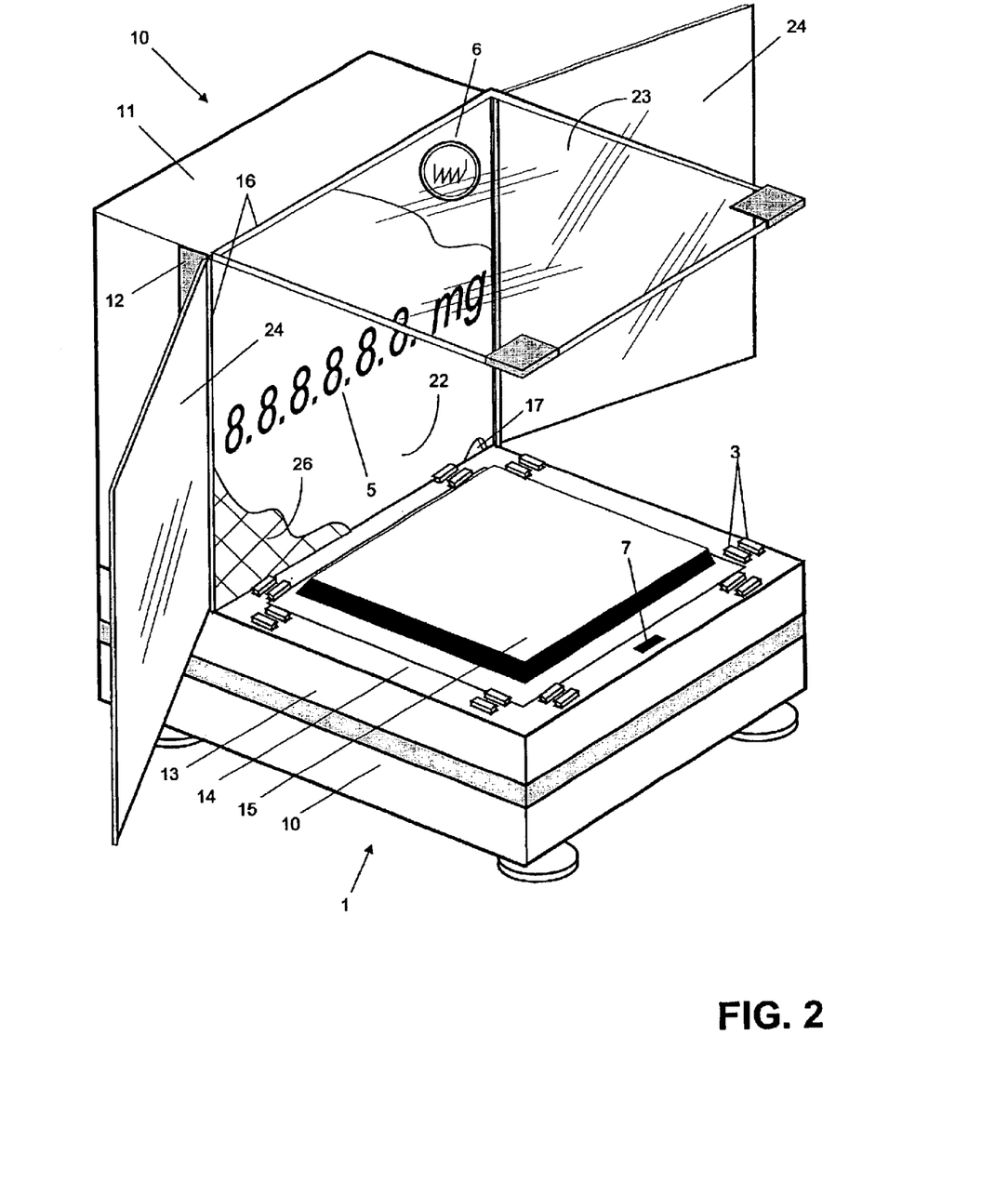
FIG. 2 represents the balance of FIG. 1 without the body, but with door elements installed.

As can be seen further in FIG. 1, the support base 13 arranged on the housing 20 of the balance 1 supports a chamber 11 standing in the rear part of the balance 1. The chamber 11 can contain, e.g., electronic modules or, as shown in FIG. 2, an illumination device 6 that illuminates the wall panel of the chamber which forms the rear wall 22 of the weighing compartment. The chamber 11 further has an access opening 12, preferably with a cover, which allows parts of the draft protection device 2 and/or a foldable version of the body 20 to be put into the chamber 11 for storage. The access opening 12 can be on the side of the chamber, or it can be on top, in which case the opening could be connected with the lid 23 for opening and closing.

FIG. 2 shows a balance 1 without the U-shaped body 20 which may have been removed, e.g. to clean the weighing compartment. As an addition or as an alternative to the U-shaped body 20, door elements 24 can be installed on the balance. The door elements are rotatably connected to the rear wall 22, e.g., by a hinge 16. As shown in FIG. 2, the lid 23 can likewise be attached to the rear wall 22 through a hinge 16.

Under the configuration shown in FIG. 2, the rear wall 22 is made of a material 26 that diffuses the transmitted ambient light, for example a frosted glass, so that the weighing compartment is illuminated uniformly from the rear. The advantages of the light-diffusing material are on the one hand that the weighing compartment is flooded by the light from the outside and on the other hand that components located behind the rear wall 22, such as electrical modules or cables, are kept from view so that they do not detract from the appearance of the balance. A further embodiment of this type of a rear wall will be described below in the context of FIG. 11.

The rear wall 22 further has at its bottom edge an opening 17 that serves as a passage for electrical cables or other conduits, for example to connect devices that are used inside the weighing compartment. The passage into the weighing compartment through the cable passage opening 17 can be facilitated in particular by a design where the rear wall 22 is removable as will also be described below in the context of FIG. 11. It is also conceivable to use an arrangement of one or more cable passage openings 17 that are located at a lateral border or at the top border of the rear wall 22.

The rear wall 22 further includes a display 5, for example a backlit liquid crystal display, a feature that is particularly advantageous in combination with the inventive draft protection device 2. The display 5 provided in the rear wall 22 can, for example, indicate the weighing result. This is very convenient when carrying out a weighing procedure, because the display 5 as well as the weighing pan 15 with the material being weighed are simultaneously within the viewing field of the user of the balance.

Displays using LCDs (liquid crystal devices) and LEDs (light-emitting diodes) as well as their associated electronic circuits are described, e.g., in reference [6], Mool C. Gupta, Handbook of Photonics, CRC Press, Boca Raton 1997, pages 782–793, and in reference [7], U. Tietze, Ch. Schenk, Halbleiterschaltungstechnik (Semiconductor Circuit Design), $11^{th}$ edition, $2^{nd}$ printing, published by Springer Verlag, Berlin 1999, pages 1126–1129 and 1307–1308.

As shown in FIG. 2, there can be sensors 7, for example switches or opto-electronic components, to automatically detect the selected position of the body 20. If more than one body 20 is provided for the balance, the sensors 7 may serve to detect which of the bodies 20 is installed. The controllable elements of the balance 1, motor-driven wind-blocking elements, for example the lid 23 or the door elements 24, the illumination device 6 or the display 5, can thus be actuated in accordance with the selected position of the body 20, so as to optimize the level of convenience for the user. Opto-electronic components for use as light sensors or photo-electric detectors are described for example in reference [6], pages 301–302 and in reference [7], pages 1299–1306.

If the draft protection device 2 is not needed, the component parts of the device, i.e., the U-shaped body 20, the lid 23 and the door elements 24, can easily be removed in a few simple steps, and at least some of the parts can be stored in the chamber 11, as already mentioned above.

Figures 3, 4, 5:
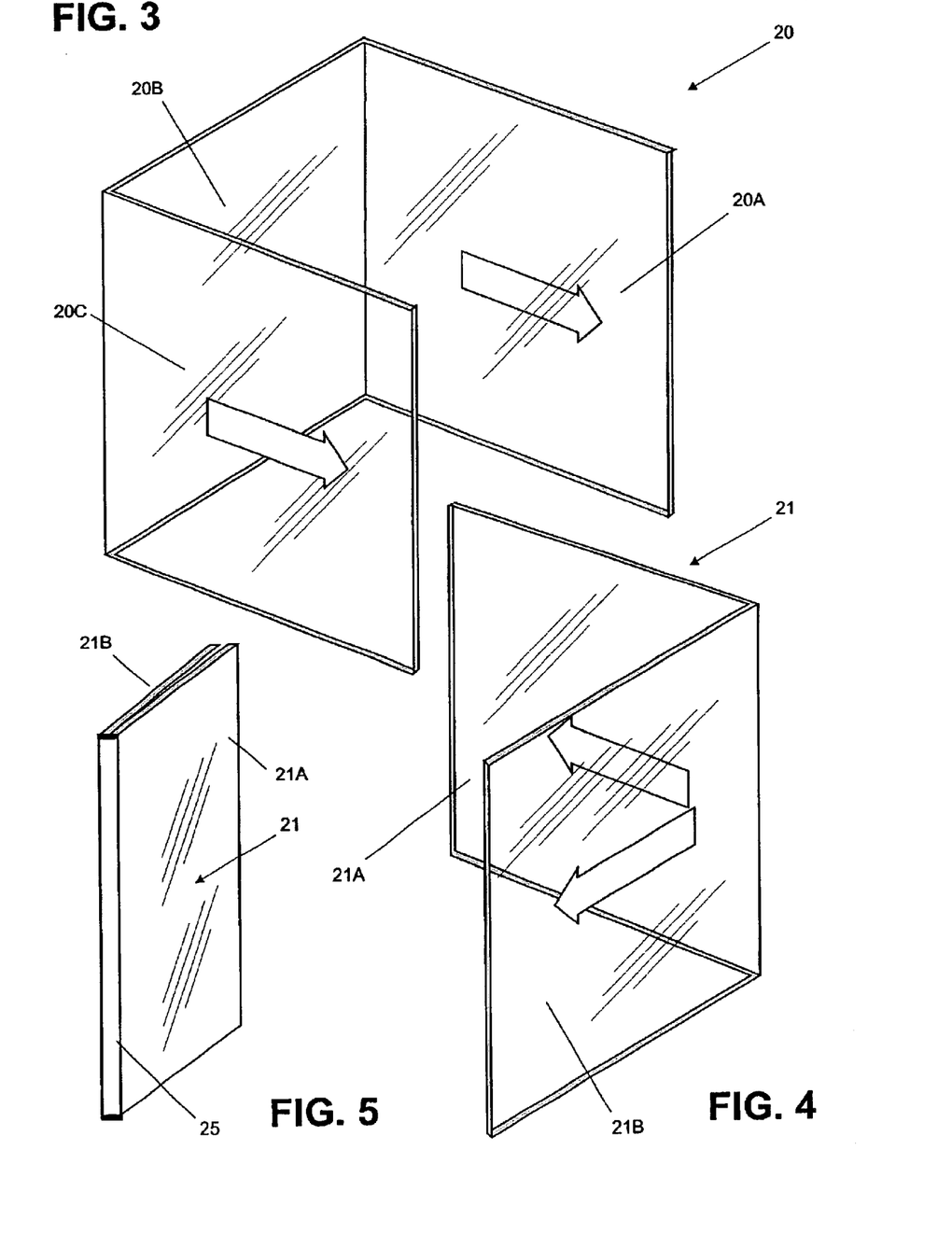
FIG. 3 represents the U-shaped body of the device shown in FIG. 1.
FIG. 4 represents an L-shaped body.
FIG. 5 represents the L-shaped body of FIG. 4 in a preferred embodiment where the two parts of the L are folded together.

The U-shaped body 20, which is shown by itself in FIG. 3, can be positioned with several different orientations as shown in FIGS. 1, 6, 7, 8 and 10. In each of the positions, at least one opening is available for access to the weighing compartment. As can be seen in FIGS. 1, 6, 7, 8 and 10, the openings in each of the illustrated positions of the body 20 give access to the weighing compartment from different directions. In preferred embodiments, the openings can furthermore be closed by means of the lid 23 or the door elements 24, so that a variety of fully functional configurations can be realized with the draft protection device 2. Thus, the user can adapt the draft protection device 2 very easily to the requirements of a present application.

Figure 9:
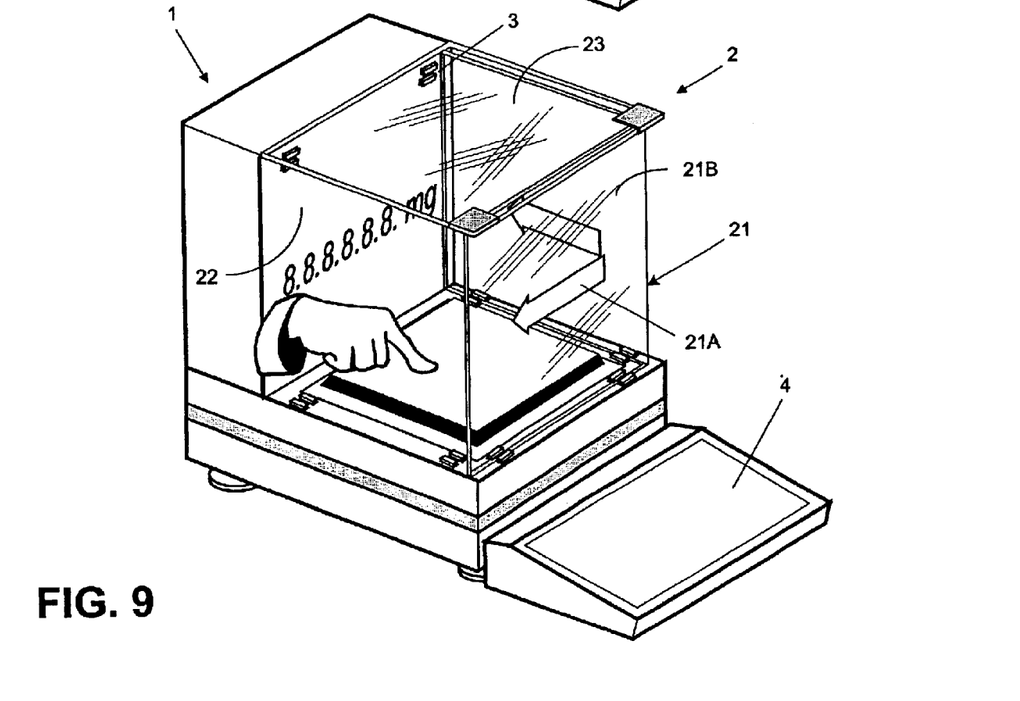
FIG. 9 represents the balance of FIG. 1 with an L-shaped body lying horizontally, where the legs of the L form the right side panel and the front panel of the draft protection device and the weighing compartment is therefore accessible from the left side.

The body which according to the invention can be positioned in different orientations, can have numerous other forms besides the shape of a U. FIGS. 4 and 9 illustrate an L-shaped body 21, which can likewise be positioned in different orientations. A V-shape is likewise conceivable for the design of a body according to the invention in a case where the overall shape of the draft protection device is triangular.

The body 20; 21, which is designed to be positioned in different orientations, can be made in a single integral piece, for example as a casting, or it may consist of two or more panel elements 20A, 20B, 20C; 21A, 21B, that are rigidly connected, e.g., by means of an adhesive, or foldably hinged to each other.

FIG. 5 shows two panel elements 21A, 21B connected to each other by a hinge 25. The panels can be unfolded into an L-shaped body 21 as shown in FIG. 4.

The panel elements 20A, 20B, 20C; 21A, 21B of the body 20; 21 can have a diversity of shapes and can be made of a variety of transparent and/or opaque and/or light-diffusing materials such as clear glass, frosted glass, plastic and/or metal. As an example, it is also possible to use glass panels or plastic panels set in metal frames or corner profiles. Preferably, the panel elements 20A, 20B, 20C; 21A, 21B have plane surfaces, but they can also have curved shapes.

It is particularly advantageous if a body 20; 21 that can be positioned in different orientations is combined with a housing 10 of the type shown in FIGS. 1 to 10. The rear wall 22 and the support base 13 which in the illustrated embodiment extend perpendicular to each other form an ideal complement to the body 20; 21 in its different selectable orientations which will be explained in detail in the context of FIGS. 6 to 10. FIGS. 6 to 9 also illustrate the keyboard 4 that serves to operate the balance 1.

Figure 6:
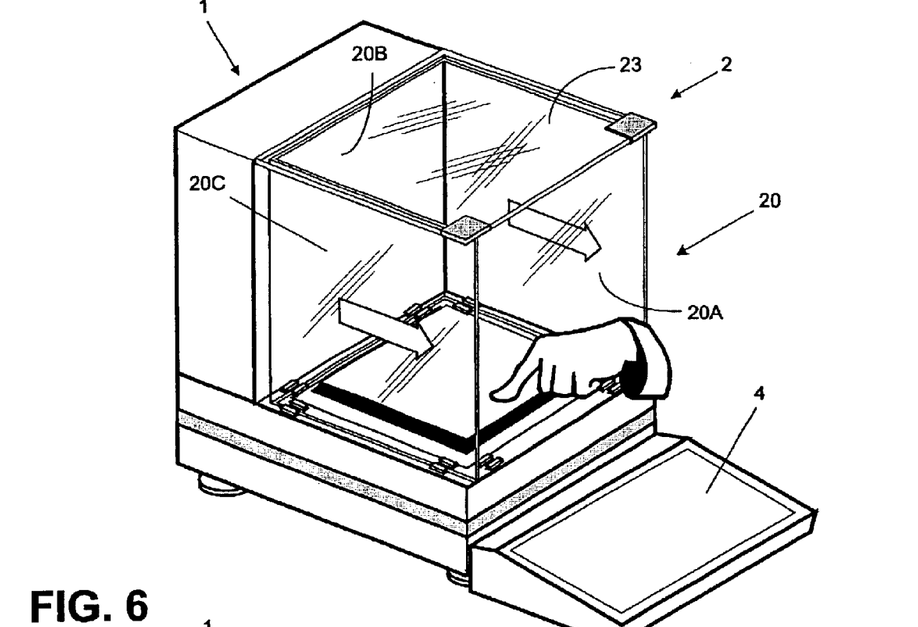
FIG. 6 represents the balance of FIG. 1 with the U-profile of the body lying horizontally so that the legs of the U point towards the front and the weighing compartment is therefore accessible from the front.

FIG. 6 shows the balance 1 with the U-profile of the body 20 lying horizontally so that the legs 20A, 20C of the U point towards the front as indicated by the arrows on the legs 20A, 20C. The weighing compartment is therefore accessible from the front and, if the lid is opened, also from above. The mid-section 20B of the U is in this case positioned against the rear wall 22.

Figure 7:
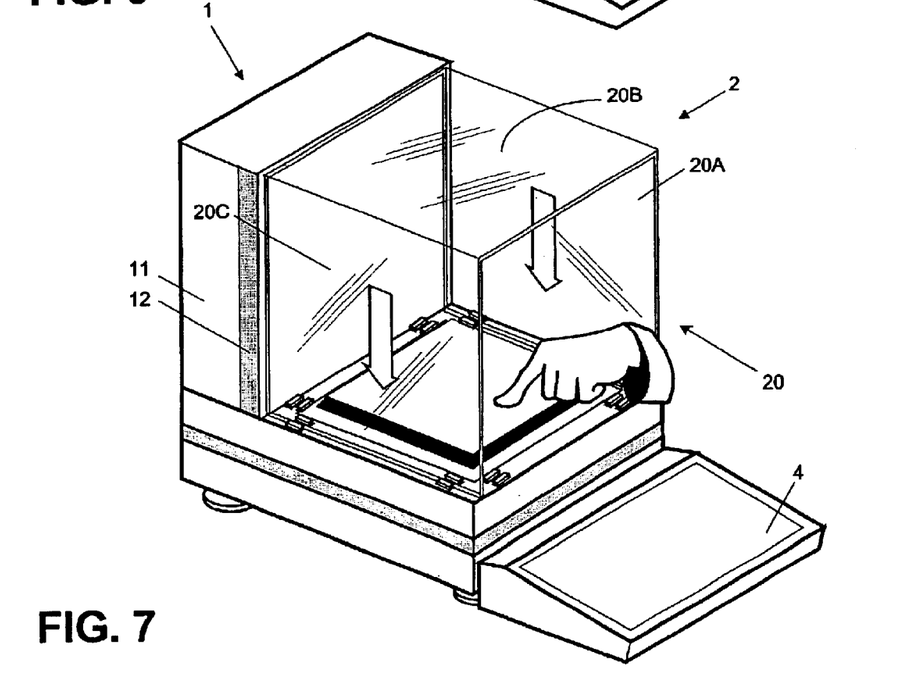
FIG. 7 represents the balance of FIG. 1 with the U-profile of the body standing upside down so that the legs of the U are planted on the lateral borders of the base and the weighing compartment is therefore accessible from the front.

FIG. 7 shows the balance 1 with the U-profile of the body 20 standing upside down so that the legs 20A, 20C of the U are supported along the lateral borders of the support base 13. In the illustrated setup, the lid 23 has been removed and put into the chamber 11 through the opening 12. The weighing compartment is accessible from the front.

Figure 8:
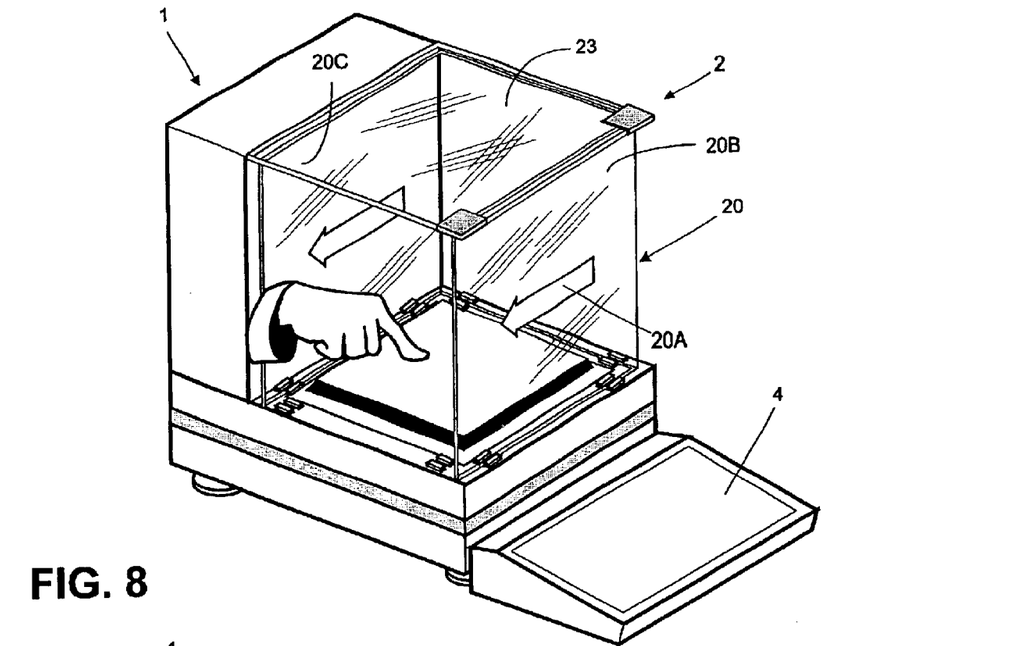
FIG. 8 represents the balance of FIG. 1 with the U-profile of the body lying horizontally so that the legs of the U point towards the left side and the weighing compartment is therefore accessible from the left side.

FIG. 8 represents the balance 1 with the U-profile of the body lying horizontally so that the legs 20A, 20C of the U point towards the left side. The weighing compartment is therefore accessible from the left and, if the lid 23 is opened, also from above.

FIG. 9 represents the balance 1 with an L-shaped body 21 lying horizontally, where the legs 21A and 21B of the L form the right side panel and the front panel of the draft protection device 2. The weighing compartment is therefore accessible from the left and, if the lid is opened, also from above. In addition, FIG. 9 illustrates that the protrusions 3 or other attachment means can also be arranged at the rear wall 22.

Figure 10:
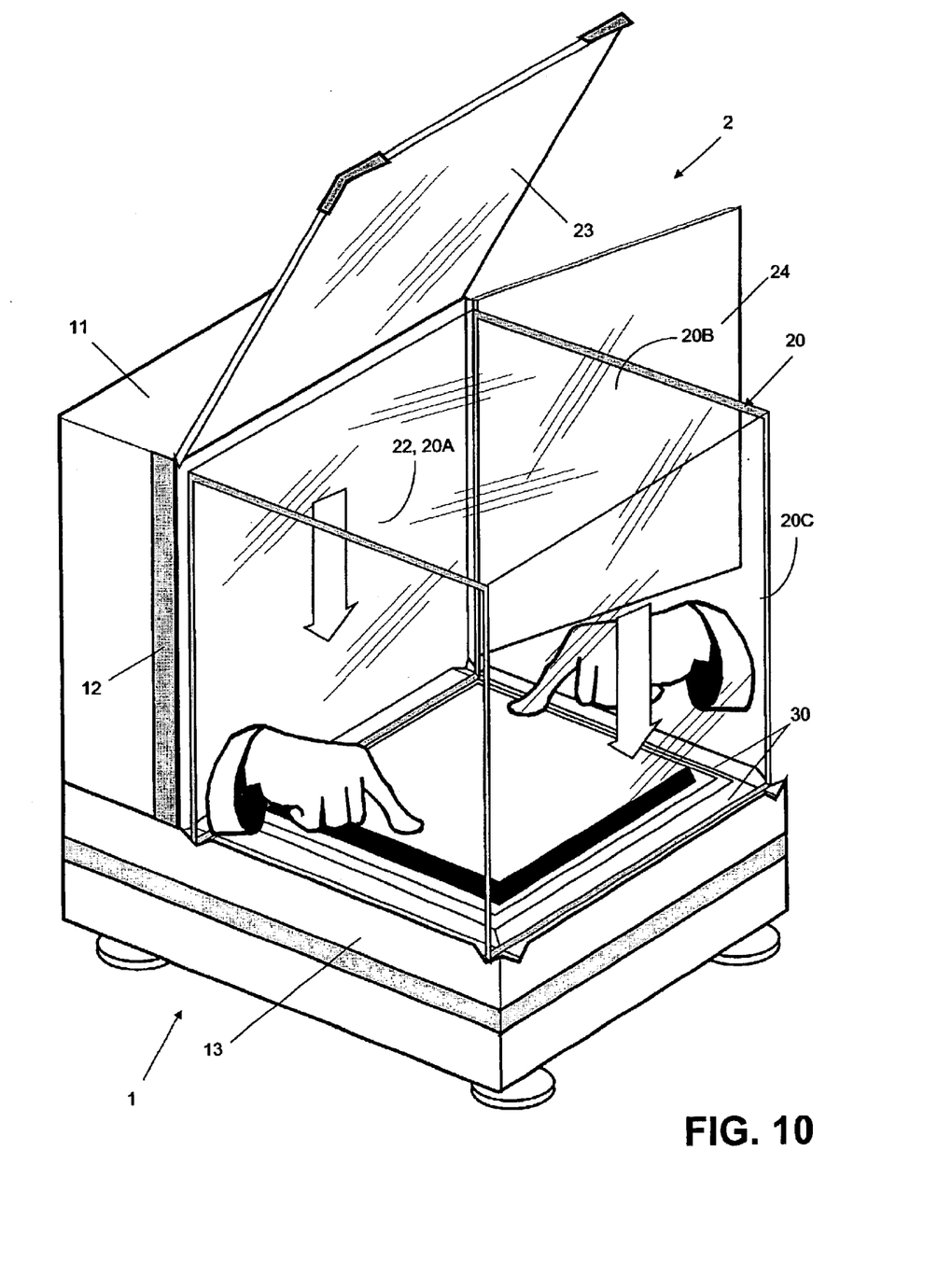
FIG. 10 represents the balance of FIG. 1 with the U-profile of the body standing upside down so that the legs of the U are supported along the front and rear borders of the weighing compartment floor and the weighing compartment is therefore accessible from the left and right sides.

FIG. 10 represents the balance 1 with the U-shaped body in a position where the legs 20A, 20C are standing on the support base 13 and are delimiting the weighing compartment at the front and rear. FIG. 10 further shows an open door element 24 on the right side and the lid 23 in a raised position. In this configuration of the draft protection device 2, the lid is preferably removed and stowed away in the chamber 11. With the door element 24 opened, the weighing compartment is therefore accessible from the left and right sides. One might add here that it is not an absolute requirement to keep all openings of the draft protection device 2 closed during the weighing process, particularly if the balance has a relatively coarse resolution of the numerical weighing result.

The body 20 in the embodiment of FIG. 10 is held in position by grooves or abutments 30 rather than by protrusions 3. The grooves or abutments 30 serve primarily as positioning guides that allow the body 20 to be set in position quickly and precisely. Depending on the characteristics of the body 20, 21, for example depending on whether the panel elements 20A, 20B, 20C; 21A, 21B are connected to each other rigidly or flexibly, or whether the body is made of one integral piece, the body can be held in place by its own weight on the support base 13 so that it is only necessary to provide means for guiding the body into its correct position.

It is also possible to use additional fastening or retaining means. One could, e.g., use screws or clamps. It is further particularly advantageous to use adhesive surface layers consisting of, e.g., hard rubber, to hold the body 20, 21 in place, e.g., by adhesive friction.

In choosing a fastening means, one should be guided by the principle that the fastening means should not interfere with the cleaning of the balance 1.

Figure 11:
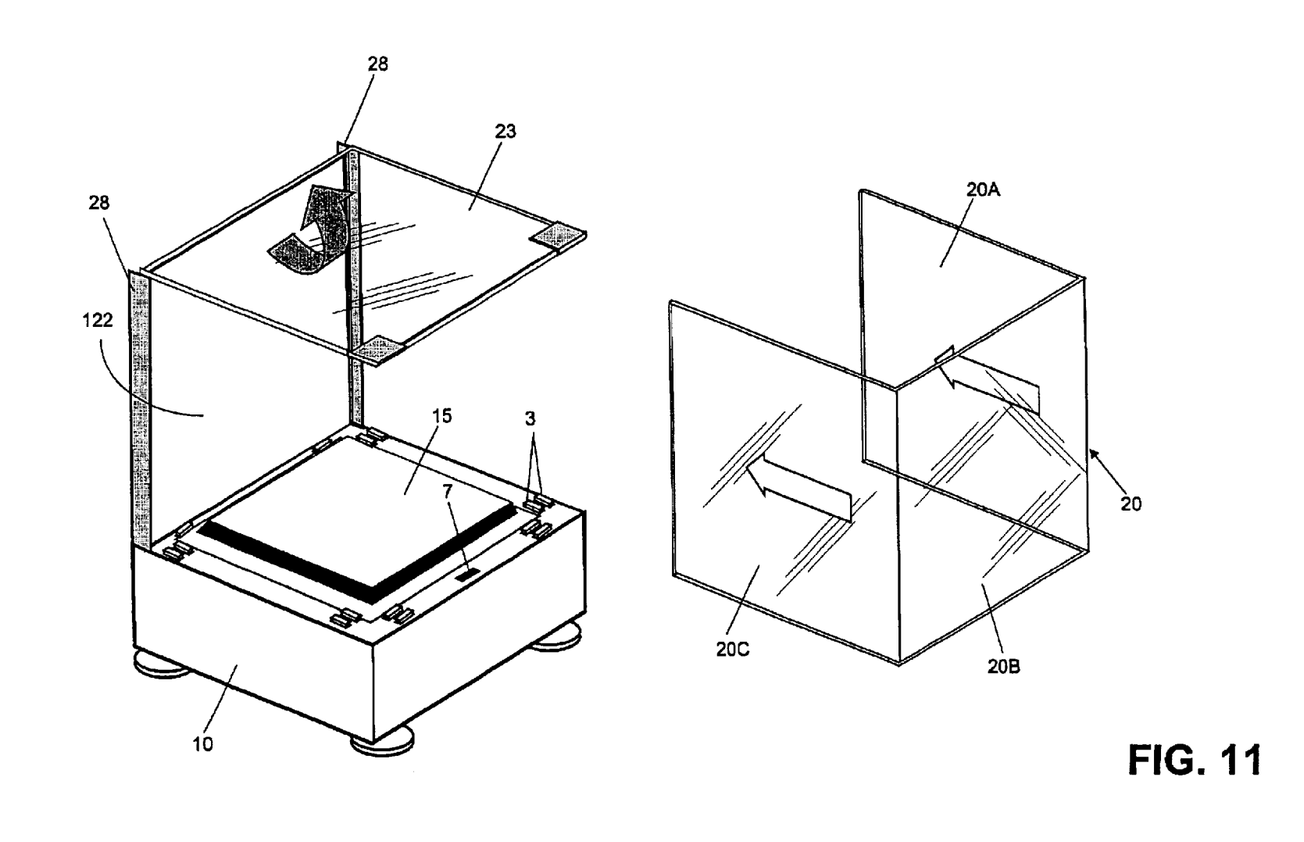
FIG. 11 represents a further embodiment of the balance according to the invention that is equipped with a draft protection device according to the invention.

FIG. 11 shows a further embodiment of the balance where the chamber 11 (see FIGS. 1 to 10) has been left out. The rear wall 122 which can be made of frosted glass as described in the context of FIG. 2 is held between two vertical rails 28. The rear wall panel 122 can be pulled up and out of the rails 28 and replaced by another wall panel if necessary, for example a transparent glass panel or a non-transparent metal panel. Of course, the rear wall 122 could also be fastened directly to the balance housing 10 or seated in a positioning guide on the balance housing 10. The balance shown in FIG. 11 does not have a support base. Rather, the topside of the balance housing 10 serves as a seat for the body 20; 21 which can be positioned in different orientations as described above.

The draft protection device of the present invention has been described and illustrated in preferred configurations. However, guided by the teachings of the invention, persons of ordinary skill in the art will be able to realize further embodiments. In particular, the body or bodies of the draft protection element could be designed with different shapes and materials. It is further considered self-evident that the housing of the balance, too, could have a different shape.

What is claimed is:

1. A draft protection device (2) for a balance (1) with a weighing pan (15) arranged in a weighing compartment, wherein the draft protection device (2) comprises a wind-blocking body (20; 21) that consists of at least two panel elements (20A, 20B, 20C; 21A, 21B) and partially encloses the weighing compartment, wherein the wind-blocking body (20; 21) is configured so that it can be selectively positioned by removal from and reseating on the balance (1) by hand in at least two different orientations, wherein in each of said different orientations at least one opening is available for access to the weighing compartment, and wherein the openings resulting from the different orientations allow access to the weighing compartment from different directions.

2. The draft protection device of claim 1, wherein the balance (1) comprises a balance housing (10), and wherein the balance housing (10) and the wind-blocking body (20; 21) are configured so that the wind-blocking body (20; 21) can be positioned on the balance housing (10).

3. The draft protection device of claim 1, wherein the balance (1) comprises a support base (13), and wherein the support base (13) and the wind-blocking body (20; 21) are configured so that the wind-blocking body (20; 21) can be positioned on the support base (13).

4. The draft protection device of claim 1, wherein the at least two panel elements (20A, 20B, 20C; 21A, 21B) together consist of one integral piece.

5. The draft protection device of claim 1, wherein the at least two panel elements (20A, 20B, 20C; 21A, 21B) are rigidly connected to each other.

6. The draft protection device of claim 1, wherein the at least two panel elements (20A, 20B, 20C; 21A, 21B) are foldably hinged to each other.

7. The draft protection device of claim 15 wherein the panel elements (20A, 20B, 20C; 21A, 21B), at least when positioned on the balance (1), form a profile that substantially resembles one of the letters L, V, U.

8. The draft protection device of claim 1, wherein the balance (1) has a rear wall (22, 122) which delimits the weighing compartment on one side and which is made of a material (26) that diffuses transmitted ambient light.

9. The draft protection device of claim 8, wherein said material (26) comprises a frosted glass.

10. The draft protection device of claim 1, wherein at least one of the panel elements (20A, 20B, 20C; 21A, 21B) is made of a material (26) that diffuses the transmitted ambient light.

11. The draft protection device of claim 10, wherein said material (26) comprises a frosted glass.

12. The draft protection device of claim 1, wherein the weighing compartment has a floor (14) and is delimited on one side by a rear wall (22, 122) that rises substantially vertically from said floor (14).

13. The draft protection device of claim 8, wherein the rear wall (22, 122) is equipped with a display (5).

14. The draft protection device of claim 13, wherein the display (5) comprises a backlit liquid crystal display.

15. The draft protection device of claim 8, wherein the balance is equipped with an illumination device (6) to light up the rear wall (22, 122).

16. The draft protection device of claim 8, wherein the rear wall (22, 122) is configured so that it can be removed and exchanged against another rear wall.

17. The draft protection device of claim 12, wherein the balance further comprises a lid (23) which is hinged on the rear wall (22, 122).

18. The draft protection device of claim 1, comprising at least one additional wind-blocking element (23, 24) configured as one of a swiveling wind-blocking element and a sliding wind-blocking element by means of which the at least one opening can be at least partially closed.

19. The draft protection device of claim 2, wherein the wind-blocking body (20, 21) in its different positions conforms to the housing (10).

20. The draft protection device of claim 3, wherein the wind-blocking body (20, 21) in its different positions conforms to the support base (13).

21. The draft protection device of claim 12, wherein the wind-blocking body (20, 21) in its different positions conforms to the rear wall (22, 122).

22. The draft protection device of claim 17, wherein the wind-blocking body (20, 21) in its different positions conforms to the lid (23).

23. The draft protection device of claim 1, further comprising fastening means (3) for holding the wind-blocking body (20; 21) in a selected position.

24. The draft protection device of claim 1, further comprising positioning guides (30) by means of which the wind-blocking body (20; 21) can be positioned quickly and precisely.

25. The draft protection device of claim 6, wherein the balance further comprises a chamber (11) connected to a rear wall (22) and configured for storing said at least two foldably hinged panel elements (20A, 20B, 20C; 21A, 21B).

26. The draft protection device of claim 18, wherein the at least one additional wind-blocking element (23; 24) is removable and wherein the balance further comprises a chamber (11) connected to a rear wall (22) and configured for storing said removable additional wind-blocking element (23; 24).

27. A balance (1) comprising the draft protection device (2) in accordance with claim 1.

28. A balance (1) comprising the draft protection device (2) in accordance with claim 26.

29. The balance of claim 28, wherein the rear wall comprises hinges (16) for a hinged connection of the at least one additional wind-blocking element (23; 24).

30. The balance of claim 27, further comprising at least one of a sensor (7), a switch, and an opto-electronic component operable to detect a selected position of the wind-blocking body (20; 21).

31. The balance of claim 27, wherein the wind-blocking body (20; 21) can be selected from a plurality of wind-blocking bodies and wherein the balance further comprises at least one of a sensor (7), a switch, and an opto-electronic component operable to detect the selected wind-blocking body (20; 21).

* * * * *